US010482513B1

(12) United States Patent
Venkiteswaran

(10) Patent No.: US 10,482,513 B1
(45) Date of Patent: *Nov. 19, 2019

(54) METHODS AND SYSTEMS FOR INTEGRATING PROCUREMENT SYSTEMS WITH ELECTRONIC CATALOGS

(71) Applicant: Vinimaya, LLC, San Mateo, CA (US)

(72) Inventor: Vaidhyanathan Venkiteswaran, West Chester, OH (US)

(73) Assignee: VINIMAYA, LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/889,815

(22) Filed: Feb. 6, 2018

Related U.S. Application Data

(60) Continuation of application No. 14/725,204, filed on May 29, 2015, now Pat. No. 9,996,863, which is a continuation of application No. 12/833,396, filed on Jul. 9, 2010, now Pat. No. 9,070,164, which is a division of application No. 10/360,755, filed on Nov. 30, 2001, now Pat. No. 7,756,750.

(60) Provisional application No. 60/336,057, filed on Nov. 30, 2001.

(51) Int. Cl.
*G06Q 30/00* (2012.01)
*G06Q 30/06* (2012.01)
*G06Q 40/04* (2012.01)

(52) U.S. Cl.
CPC ......... *G06Q 30/0603* (2013.01); *G06Q 30/06* (2013.01); *G06Q 30/0613* (2013.01); *G06Q 30/0623* (2013.01); *G06Q 30/0625* (2013.01); *G06Q 30/0627* (2013.01); *G06Q 30/0629* (2013.01); *G06Q 30/0633* (2013.01); *G06Q 30/0641* (2013.01); *G06Q 40/04* (2013.01)

(58) Field of Classification Search
CPC ................................ G06Q 30/00–08
See application file for complete search history.

(56) References Cited

U.S. PATENT DOCUMENTS 5,317,737 A 5/1994 Barton
5,628,011 A 5/1997 Ahamed et al.
5,712,989 A 1/1998 Johnson et al.
(Continued)

OTHER PUBLICATIONS

"Glovia Rolls Out a Powerful, Web-Enabled Configuration Solution," Business Editors and High-Tech Writers, Business Wire, New York, May 16, 2001, 1 pg.
(Continued)

*Primary Examiner* — Michael Misiaszek
(74) *Attorney, Agent, or Firm* — Hickman Palermo Becker Bingham LLP

(57) ABSTRACT

A request for shopping is placed from inside a procurement system. Intelligent agents are launched to retrieve information from catalog sources web-enabled over the internet or within the intranet. Retrieved catalog information is aggregated and associated with other data items. Business rules are applied to make decisions on what part of aggregated information will be rendered to a User. Sorting/multi-level refining operations are enabled. The User selects one or more catalog results, whereupon an XML shopping cart is created and submitted to the procurement system through published interfaces. The procurement system is enabled to place an order on supplier web-enabled transaction systems.

24 Claims, 2 Drawing Sheets

VINISYNDICATE AND CATALOG SOURCES

(56) References Cited

U.S. PATENT DOCUMENTS

| | | | |
|---|---|---|---|
| 5,768,580 A | 6/1998 | Wical | |
| 5,859,972 A | 1/1999 | Subramaniam et al. | |
| 5,940,821 A | 8/1999 | Wical | |
| 6,028,605 A | 2/2000 | Conrad et al. | |
| 6,038,560 A | 3/2000 | Wical | |
| 6,119,101 A | 9/2000 | Peckover | |
| 6,175,830 B1 | 1/2001 | Maynard | |
| 6,233,586 B1 | 5/2001 | Chang et al. | |
| 6,263,342 B1 | 7/2001 | Chang et al. | |
| 6,272,488 B1 | 8/2001 | Chang et al. | |
| 6,330,714 B1 | 12/2001 | Hicks et al. | |
| 6,370,541 B1 | 4/2002 | Chou et al. | |
| 6,446,083 B1 | 9/2002 | Leight et al. | |
| 6,463,430 B1 | 10/2002 | Brady et al. | |
| 6,466,933 B1 | 10/2002 | Huang et al. | |
| 6,484,166 B1 | 11/2002 | Maynard | |
| 6,513,027 B1 | 1/2003 | Powers et al. | |
| 6,556,976 B1 | 4/2003 | Callen | |
| 6,578,046 B2 | 6/2003 | Chang et al. | |
| 6,647,383 B1 | 11/2003 | August et al. | |
| 6,650,998 B1 | 11/2003 | Rutledge et al. | |
| 6,654,813 B1 | 11/2003 | Black et al. | |
| 6,665,681 B1 | 12/2003 | Vogel | |
| 6,728,704 B2 | 4/2004 | Mao et al. | |
| 6,732,160 B2 | 5/2004 | Ambrosini et al. | |
| 6,735,760 B1 | 5/2004 | Dice | |
| 6,768,999 B2 | 7/2004 | Prager et al. | |
| 6,772,153 B1 | 8/2004 | Bacon et al. | |
| 6,778,975 B1 | 8/2004 | Anick et al. | |
| 6,792,416 B2 | 9/2004 | Soetarman et al. | |
| 6,792,601 B1 | 9/2004 | Dimpsey et al. | |
| 6,859,937 B1 | 2/2005 | Narayan et al. | |
| 6,868,525 B1 | 3/2005 | Szabo | |
| 6,895,407 B2 | 5/2005 | Romer et al. | |
| 6,920,448 B2 | 7/2005 | Kincaid et al. | |
| 6,922,691 B2 | 7/2005 | Flank | |
| 6,941,294 B2 | 9/2005 | Flank | |
| 6,944,611 B2 | 9/2005 | Flank et al. | |
| 6,988,099 B2 | 1/2006 | Wiser et al. | |
| 6,994,612 B2 | 2/2006 | Cron | |
| 7,031,961 B2 | 4/2006 | Pitkow et al. | |
| 7,035,870 B2 | 4/2006 | McGuire et al. | |
| 7,069,308 B2 | 6/2006 | Abrams | |
| 7,073,133 B2 | 7/2006 | Hughes et al. | |
| 7,085,771 B2 | 8/2006 | Chung et al. | |
| 7,113,939 B2 | 9/2006 | Chou et al. | |
| 7,117,214 B2 | 10/2006 | Wiser et al. | |
| 7,177,818 B2 | 2/2007 | Nair | |
| 7,177,879 B2 | 2/2007 | Flank et al. | |
| 7,181,438 B1 | 2/2007 | Szabo | |
| 7,188,153 B2 | 3/2007 | Lunt et al. | |
| 7,222,090 B2 | 5/2007 | Oddo | |
| 7,272,833 B2 | 9/2007 | Yaung | |
| 7,330,846 B1 | 2/2008 | Dirisala et al. | |
| 7,343,371 B2 | 3/2008 | Ibuki et al. | |
| 7,418,444 B2 | 8/2008 | Flank et al. | |
| 7,451,161 B2 | 11/2008 | Zhu et al. | |
| 7,461,024 B2 | 12/2008 | Montgomery | |
| 7,519,605 B2 | 4/2009 | Vailaya et al. | |
| 7,536,386 B2 | 5/2009 | Samji et al. | |
| 7,555,448 B2 | 6/2009 | Hsieh | |
| 7,565,425 B2 | 7/2009 | Vleet et al. | |
| 7,567,953 B2 | 7/2009 | Kadayam et al. | |
| 7,567,963 B2 | 7/2009 | Shpeisman et al. | |
| 7,610,585 B2 | 10/2009 | Shpeisman et al. | |
| 7,620,572 B2 | 11/2009 | Bowman et al. | |
| 7,660,783 B2 | 2/2010 | Reed | |
| 7,703,030 B2 | 4/2010 | Smirin et al. | |
| 7,707,167 B2 | 4/2010 | Kishore et al. | |
| 7,721,192 B2 | 5/2010 | Milic-Frayling et al. | |
| 7,739,218 B2 | 6/2010 | Arguello et al. | |
| 7,756,750 B2* | 7/2010 | Venkiteswaran | G06Q 30/0613 705/26.41 |
| 7,761,385 B2 | 7/2010 | Hutchison et al. | |
| 7,801,879 B2 | 9/2010 | Jones | |
| 7,860,852 B2 | 12/2010 | Brunner et al. | |
| 7,865,358 B2 | 1/2011 | Green et al. | |
| 7,957,985 B2 | 6/2011 | Kashani et al. | |
| 7,996,282 B1 | 8/2011 | Scott et al. | |
| 8,036,957 B2 | 10/2011 | Ettl et al. | |
| 8,046,273 B2 | 10/2011 | Welter et al. | |
| 8,051,450 B2 | 11/2011 | Robarts et al. | |
| 8,055,673 B2 | 11/2011 | Churchill et al. | |
| 8,060,513 B2 | 11/2011 | Basco et al. | |
| 8,126,882 B2 | 2/2012 | Lawyer | |
| 8,166,016 B2 | 4/2012 | Higgins et al. | |
| 8,204,797 B2 | 6/2012 | Wanker | |
| 8,249,885 B2 | 8/2012 | Berkowitz et al. | |
| 8,266,130 B2 | 9/2012 | Jones et al. | |
| 8,396,859 B2 | 3/2013 | Green et al. | |
| 8,554,755 B2 | 10/2013 | Richardson et al. | |
| 9,070,164 B2* | 6/2015 | Venkiteswaran | G06Q 30/0613 |
| 9,607,324 B1 | 3/2017 | Reed et al. | |
| 9,996,863 B2* | 6/2018 | Venkiteswaran | G06Q 30/0613 |
| 10,007,729 B1 | 6/2018 | Reed et al. | |
| 2001/0014905 A1 | 8/2001 | Onodera | |
| 2001/0034659 A1 | 10/2001 | Kobayashi | |
| 2001/0037332 A1 | 11/2001 | Miller et al. | |
| 2001/0039592 A1 | 11/2001 | Carden | |
| 2002/0065744 A1 | 5/2002 | Collins | |
| 2002/0077929 A1 | 6/2002 | Knorr et al. | |
| 2002/0082952 A1 | 6/2002 | Johnston | |
| 2002/0120685 A1 | 8/2002 | Srivastava et al. | |
| 2002/0147656 A1 | 10/2002 | Tam et al. | |
| 2002/0165856 A1 | 11/2002 | Gilfillan et al. | |
| 2002/0194208 A1 | 12/2002 | Knoll et al. | |
| 2003/0084010 A1 | 5/2003 | Bigus et al. | |
| 2003/0120653 A1 | 6/2003 | Brady et al. | |
| 2004/0167827 A1 | 8/2004 | Vincent et al. | |
| 2005/0010561 A1 | 1/2005 | de Bois et al. | |
| 2005/0027611 A1 | 2/2005 | Wharton | |
| 2005/0149538 A1 | 7/2005 | Singh et al. | |
| 2005/0160107 A1 | 7/2005 | Liang | |
| 2007/0027811 A1 | 2/2007 | Jackson et al. | |
| 2008/0040332 A1 | 2/2008 | Lee et al. | |
| 2008/0275719 A1 | 11/2008 | Davis et al. | |
| 2008/0281793 A1 | 11/2008 | Mathur | |
| 2008/0306924 A1 | 12/2008 | Paolini | |
| 2009/0271212 A1 | 10/2009 | Savjani et al. | |
| 2009/0327006 A1 | 12/2009 | Hansan et al. | |
| 2010/0169228 A1 | 7/2010 | Rothley et al. | |
| 2012/0143721 A1 | 6/2012 | Hutchinson et al. | |
| 2012/0143725 A1 | 6/2012 | Hutchinson et al. | |
| 2017/0161283 A1 | 6/2017 | Reed et al. | |

OTHER PUBLICATIONS

"Vinimaya Expands B2B e-Procurement Platform to 20 Verticals; B2B Marketplaces and Suppliers Can Join the Network to Instantly Reach Fortune 200 Purchasing Managers," Business Wire, Nov. 6, 2000, pp. 1-3.

"Vinimaya Partners with AnswerPal to Establish B2B Content Development Arm," Business Wire, Oct. 11, 2000, pp. 1-2.

"Vinimaya Upgrades ViniSyndicate," Brief Article, Product Announcement, The Online Reporter, Oct. 15, 2001, p. 1.

"Vinimaya Inc. (business to business online shopping services)," Purchasing, Nov. 16, 2000, p. 1.

Vinimaya website screenshots, Vinimaya website purported 2000, pp. 1-3.

"About Kapow Technologies," Kapow Technologies website, 2009.

"Company Profile," Inc. 5000, 2009.

Letter from PurchasingNet, Inc., May 24, 2006, 4 pgs.

U.S. Appl. No. 60/336,057, filed Nov. 30, 2001.

Basware, Realize Tomorrow's Financial Goals Today, downloaded Jul. 19, 2018 from https://www.basware.com/en-us/about-basware, 2018, 20 pgs.

BirchStreet Systems, Procure-to-Pay on Demand, downloaded Jul. 19, 2018 from https://www.birchstreetsystems.com/about-us/, 2017, 6 pgs.

CapGemini, Annual Report, 2017, downloaded Jul. 19, 2018 from https://reports.capgemini.com/2017/wp-content/uploads/2018/03/CapG_RA17_UK-2.pdf, 41 pgs.

(56) References Cited

OTHER PUBLICATIONS

Cheeriojs/cheerio, GitHub, Inc., 2018, downloaded from https://github.com/cheeriosjs/cheerio.
Coupa Software, Inc., Why Coupa, downloaded Jul. 19, 2018 from https://www.coupa.com/why-coupa/, 2018, 25 pgs.
Determine, Inc., About us, downloaded Jul. 19, 2018 from https://www.determine.com/about-us, 2018, 12 pgs.
GEP, Who we are: About GEP, downloaded Jul. 19, 2018 from https://www.gep.com/company, 2018, 28 pgs.
Holst, C., "Infinite Scrolling, Pagination or "Load More" Buttons? Usability Findings in eCommerce," Smashing Magasine, Mar. 1, 2016, downloaded from https://www.smashingmagazine.com/2016/03/pagination-infinite-scrolling-load-more-buttons/, 23 pgs.
Ivalua, Inc., About Ivalua: The Procurement Empowerment Platform, downloaded Jul. 19, 2018 from https://www.ivalua.com/company/about-us/, 2018, 10 pgs.
Perfect Commerce, About Us, downloaded Jul. 19, 2018 from https://www.linkedin.com/company/perfect-commerce, 2017, 4 pgs.
PhantonJS—Scriptable Headless Browser, Mar. 2018, downloaded from https://phantomjs.org/, 1 pg.
Proactis, ReThink Commerce, downloaded Jul. 19, 2018 from https://www.proactis.com/us/company/about/, 2018, 24 pgs.
Real-Time Computing, description, May 24, 2018, https://en.wikipedia.org/wiki/Real-time_computing, citing Martin, J., *Programming Real-time Computer Systems*, Prentice-Hall, Inc., Englewood Cliffs, NJ, 1965, p. 4, https://en.wikipedia.org/wiki/Real-time_computing#cite_note-3, 3 pgs.
SAP SE, Procurement and Networks, downloaded Jul. 19, 2018 from https://www.sap.com/products/e-procurement.html, 2018, 12 pgs.
SeleniumHQ—Browser Automation, Apr. 4, 2018, downloaded from https://www.seleniumhq.org/, 3 pgs.
Version 4.0 of ViniSyndicate Catalog Integration System™ for E-Procurement. Dec. 6, 2010, 2 pgs. Downloaded from ProQuest Direct on the Internet on Dec. 17, 2014.
Wax Digital Limited, A Little Bit about Wax Digital, downloaded Jul. 19, 2018 from https://www.waxdigital.com/who-we-are/, 2018, 21 pgs.
www.ask.com—Website of fetching answer to any question asked owned by InterActiveCorp. Viewed Apr. 8, 2010.
www.clusty.com—Website of combining several top search engines owned by Vivisimo, Viewed Apr. 8, 2010.
www.facebook.com—Website of social networking owned by Facebook, Inc. Viewed on Apr. 8, 2010.
www.google.com—Website of hunting for text in webpages owned by Google Inc. Viewed Apr. 8, 2010.
www.linkedin.com—Website of business-oriented social networking. Viewed on Apr. 8, 2010.
www.myspace.com—Website of social networking owned by News Corporation. Viewed Apr. 8, 2010.
www.yahoo.com—Website of knowledge-sharing for the community. Viewed Apr. 8, 2010.
U.S. Appl. No. 12/692,117, filed Jan. 22, 2010, by Reed et al.
U.S. Appl. No. 16/007,373, filed Jun. 13, 2018, by Kitson et al.
U.S. Appl. No. 16/016,931, filed Jun. 25, 2018, by Reed et al.
U.S. Appl. No. 16/053,157, filed Aug. 2, 2018, by Hutchinson et al.
U.S. Appl. No. 61/146,967, filed Jan. 23, 2009, by Reed et al.
U.S. Appl. No. 61/146,999, filed Jan. 23, 2009, by Reed et al.
U.S. Appl. No. 61/372,688, filed Aug. 11, 2010, by Reed et al.
U.S. Appl. No. 61/418,936, filed Dec. 2, 2010, by Hutchinson et al.
U.S. Appl. No. 61/418,947, filed Dec. 2, 2010, by Hutchinson et al.
U.S. Appl. No. 62/520,756, filed Jun. 16, 2017, by Reed et al.

\* cited by examiner

VINISYNDICATE AND CATALOG SOURCES

METHODS AND SYSTEMS FOR INTEGRATING PROCUREMENT SYSTEMS WITH ELECTRONIC CATALOGS

RELATED APPLICATIONS

This application is a continuation of application Ser. No. 14/725,204, filed May 29, 2015, which is a continuation of application Ser. No. 12/833,396, filed Jul. 9, 2010, which is now U.S. Pat. No. 9,070,164, which is a divisional of application Ser. No. 10/360,755, filed Nov. 30, 2001, which is now U.S. Pat. No. 7,756,750, and which claims priority to U.S. Provisional Application No. 60/336,057, filed Nov. 30, 2001, all of which are incorporated herein by reference.

FIELD OF THE INVENTION

This invention relates to computer-based on-line procurement, where users of a buy-side procurement system can perform shopping from non-resident, distributed web-enabled catalogs.

DESCRIPTION OF RELATED ART

Lack of Supplier "electronic" Product Catalogs, or eCatalogs resident in buy-side procurement systems has created a seemingly insurmountable bottleneck for Buyers automating procurement and supply chain processes. Companies have implemented expensive buy-side applications only to discover that a mere fraction of their Supplier base can support their automation efforts without a substantial investment of both time and money. Thus, these companies may have only 5 or 10 Supplier eCatalogs resident in buy-side e-procurement systems, out of thousands of available Suppliers. limiting the number of transactions through these applications and becoming a significant hurdle in achieving their hoped-for return on investment.

Making matters worse, there are numerous manufacturers and distributors willing to provide their product information to their customers via eCatalogs. However, with multiple and disparate eCatalog formats (such as CIF, ebXML, xCBL and others), syndication approaches (e.g., OBI, cXML "punchout"), technologies (e.g., XML, EDI), and taxonomies (e.g., UNSPSC, eClass) available, only a small minority of these Suppliers have the financial resources and technical skills to meet each customer's unique needs.

Although the majority of Supplier web sites have basic product information and list pricing, they can't meet the Buyer's requirements for aggregation and user interface standardization, buyer-specific attributes such as pricing, part numbers, UNSPSC codes, integration with their eProcurement system. The bottom line is the lack of supplier catalogs available to eProcurement Systems limits transaction liquidity, seriously affecting expected savings and ROI!

BRIEF SUMMARY OF THE INVENTION

The ViniSyndicate product is a unique combination of cutting-edge technology (Intelligent Agents) applied in an innovative process (Dynamic Syndication) to solve the problem of lack of buy-side resident eCatalogs. The innovative process involves a server-resident software system that links-up with buy-side procurement system, and utilizes Intelligent Agents to execute distributed search requests over the Internet to search for and securely access product, price, availability and other relevant content directly from Suppliers' web sites or eCommerce Systems. With superior abilities to search, aggregate, customize, enhance, analyze, display and manage eCatalog content, ViniSyndicate meets the Buyer's needs, protects their current eProcurement investment and concurrently minimizes/eliminates effort for their Suppliers.

DETAILED DESCRIPTION OF THE INVENTION

Figure 1:
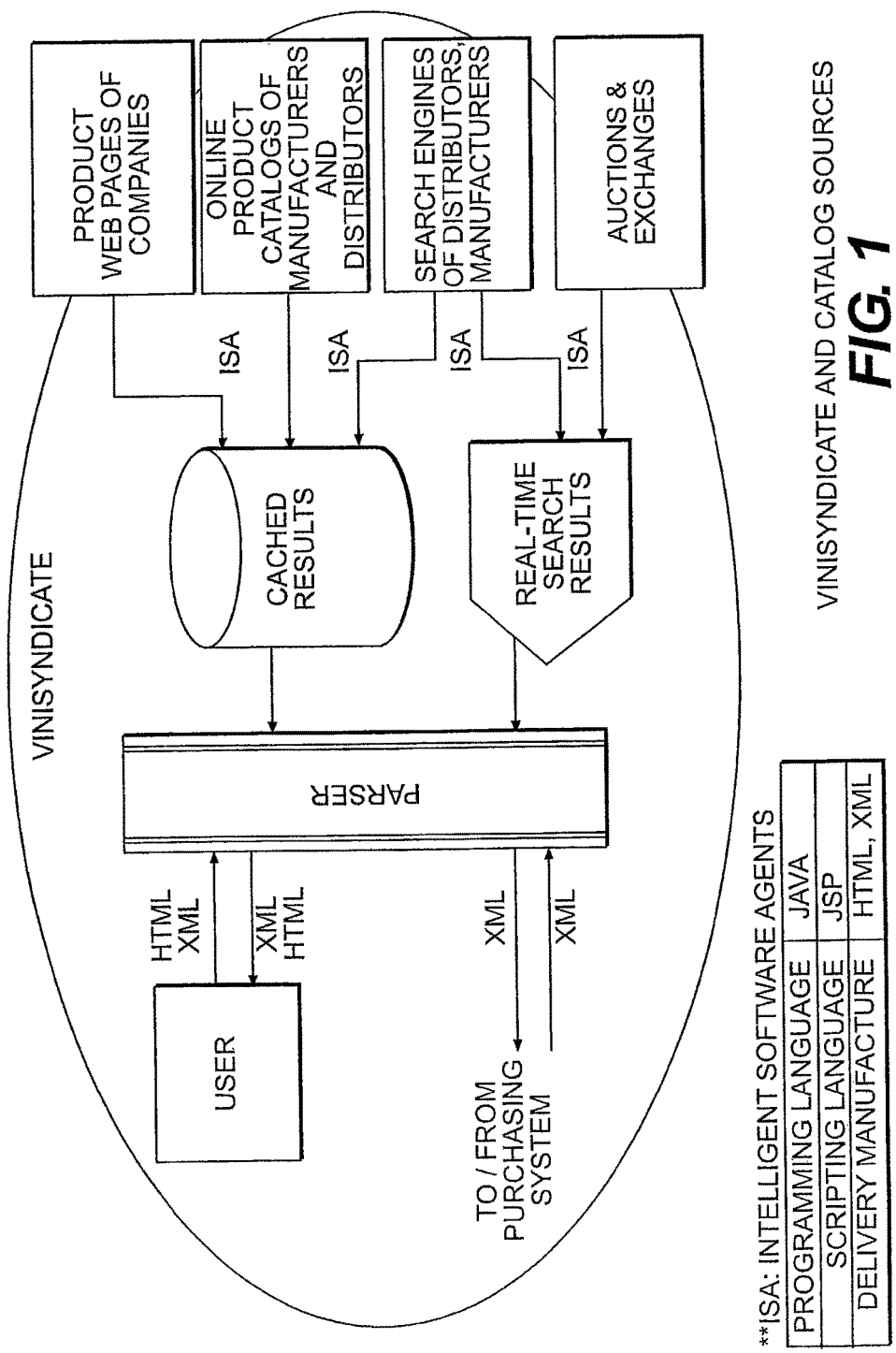
FIG. 1: ViniSyndicate and Catalog Sources, illustrates the kinds of catalog sources that ViniSyndicate can integrate to and the two models in which the catalog results can be made available to the end user (e.g. real-time and/or cached).
Figure 2:
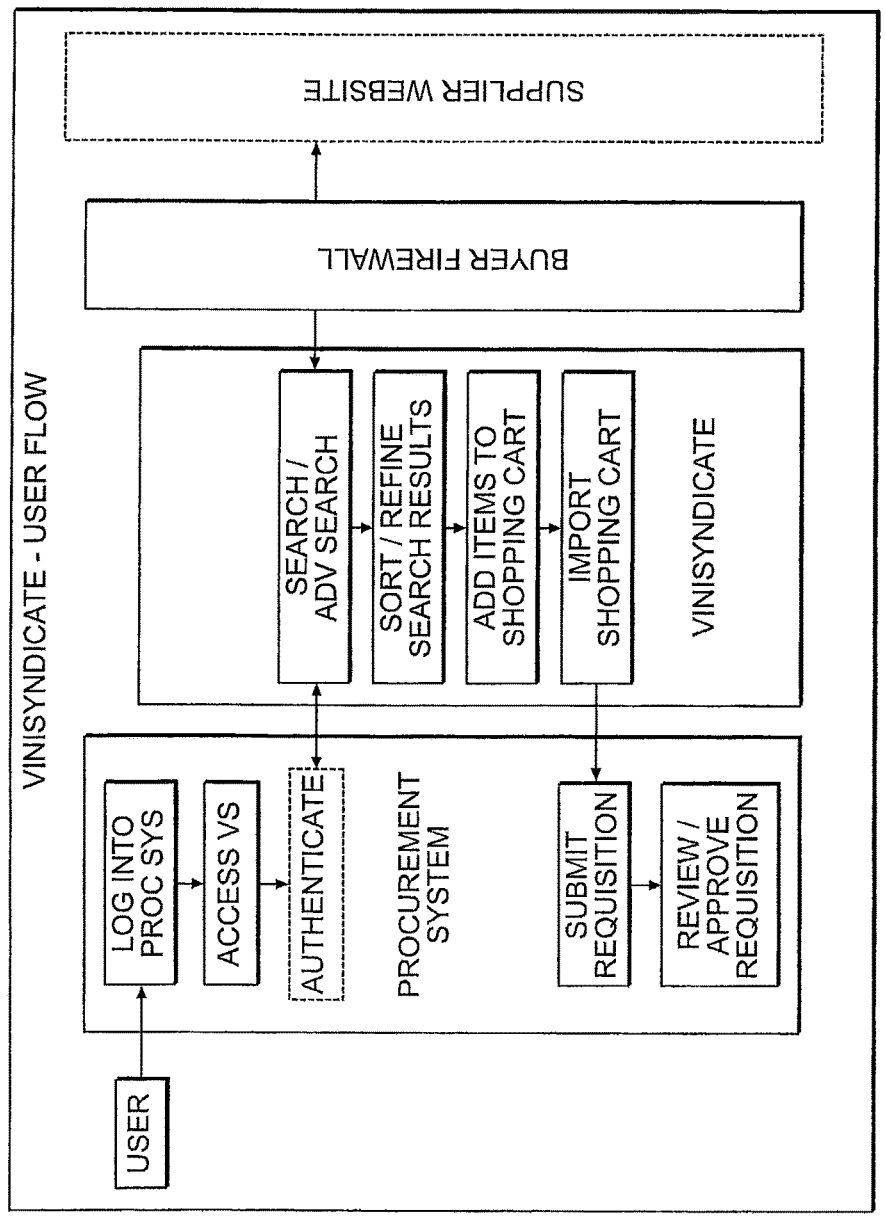
FIG. 2: ViniSyndicate User flow, illustrates how ViniSyndicate (hence forth referred to as VS) works in concert with the Buy-side procurement system.

Vinimaya Inc. is a privately held software company with a focus to develop and bring to market innovative eBusiness software products based on Intelligent Agent Technology. Its products are based on over 3 years of R&D, are built upon standard technology platforms such as Java and XML, and are designed to be easy to implement, maintain and operate. Vinimaya's flagship product "ViniSyndicate" is a buy-side eCatalog Management System that uses Intelligent Agent Technology to extract dynamic, real-time product information directly from Suppliers' web sites as they exist today, without the need for "XML punchout" and other costly, invasive modifications.

This document explains the motive, architecture and technologies behind the product ViniSyndicate developed and marketed by this company.

ViniSyndicate is a buy-side software solution, built on intelligent agent and XML technology, that enables a buy-side procurement system to be integrated with a supplier's web presence without the need for implementation of expensive sell-side punchout solutions by the supplier. A user on the buy-side procurement system would be able to dynamically convert catalog information resident on a supplier's web site (or other web-enabled sources) into an XML shopping cart that could be fetched into the procurement system.

The solution combines a rich user experience associated with shopping on a supplier's web site with the necessary buy-side control that a sourcing professional would need over what a general requisitioner would be allowed to purchase. The features include live catalog content from supplier's web site, use of Intelligent Agents for standardizing supplier catalog content, powerful, distributed search engine, dynamic XML cart generation, out-of-box integration with major procurement systems, catalog management tools addressing buy-side needs such as SKU restriction, UNSPSC codes and buyer part numbers, buyer specific product and pricing information, customizable User Interface with built-in Graphical User Interface (GUI) adaptors.

ViniSyndicate is a non-invasive approach to buyer-supplier relationship, using dynamic XML as a means of integration. This approach minimizes the time-to-deploy and time-to-ROI when compared to alternate approaches. The ViniSyndicate Dynamic Syndication functionality allows users to take advantage of supplier hosted catalogs directly from the supplier's web site. The system provides transport and translation of data from the supplier to buy-side procurement system. It is written in Java and XML, runs on both Microsoft and Unix server platforms, and is compatible with all leading web application servers. ViniSyndicate's unique functionality is derived by combining five major components into a single, integrated, highly scalable software application. Listed below are the five major components of ViniSyndicate . . . .

Component #1 is the Intelligent Agent Engine which retrieves product information, pricing, availability and other relevant information in real-time, directly from Suppliers' web sites, eCommerce systems or other web-accessible sources using secure, standard open-system HTTP/HTTPS protocol.

Component #2 is the Distributed Remote Search Engine, which performs remote searches on web-enabled, non-resident, distributed catalog sources. Also uses multi-tier searching techniques, which can utilize supplier web site search engine or configurator and supports parametric searching with relevancy.

Component #3 is the Parsing Engine, which turns unstructured, multi-format web site content into aggregated, structured eCatalogs and has a flexible, user-defined data structure.

Component #4 is the eCatalog Engine which is Configurable and customizable and allows buy-side to define attributes, navigation, add buyer part numbers, UNSPSC codes, custom pricing including buy-side to add discounts, price breaks.

Component #5 is the XML Engine used for storing, reading, parsing, mapping and rendering and syndicating XML (eXtensible Markup Language) "documents" and integrates seamlessly with published interfaces from leading buy-side eProcurement products from Ariba, Oracle, SAP, etc. via published XML interfaces such as cXML and OCI.

Implementing ViniSyndicate allows Buyers to implement supplier catalogs in days versus months or even years. ViniSyndicate is a unique, robust and cost-effective eCatalog solution that simplifies and accelerates Supplier participation, quickly increasing transaction liquidity and driving return-on-investment. They can quickly aggregate eCatalogs from hundreds (if not thousands) of Supplier catalog sources which will increase "transaction liquidity" and drive savings. ViniSyndicate fully integrates with leading buy-side eProcurement and Supply Chain Management Products "out-of-the-box".

Also, companies now get robust eCatalog management capabilities with less cost, less complexity because ViniSyndicate eliminates the need (and costs) for maintaining a large internal eCatalog data warehouse, eliminates data-transformation" costs (range from $4 to $10 per catalog line item) and requires less hardware, software, storage, outside services, people required than conventional solutions.

For Suppliers' participation in a customer's eProcurement program is simplified because there are almost no technical requirements for them when compared to conventional solutions. ViniSyndicate Intelligent Agents build a powerful bridge between the Buyers' eProcurement platforms (e.g., Ariba Buyer, SAP B2B, Oracle iProcurement, etc.) and Suppliers' web sites and other eCommerce systems. This leverages the Suppliers' existing eCommerce environment, without requiring additional investment and extensive effort on their part to meet each Buyer's specific eCatalog needs. (Estimates for punchout-enabled web sites>$100,000 per site). No need for Suppliers to support dozens of catalog formats—cXML, xCBL, EDI 832, etc. Immediate buy-side access to "real-time" information such as product availability and inventory overruns.

Despite using the supplier's web site, the Buyer still controls the process and can configure and administer the eCatalog user interface, add or remove catalogs quickly and easily, and add their own Buyer-specific, value-added information—part numbers, contract pricing, etc.

Intelligent Agents are software entities that can act on behalf of a user or a system. Simply put, the central idea underlying Intelligent Agents is "delegation". Most Intelligent Agent-based software applications in use today are designed to find and filter information, automate tasks, and communicate with systems, much like an end user would. They can be found in many of the Internet search engines in use today (e.g., Google, Ask Jeeves) as well as in many network management systems (e.g., CA Unicenter). These types of agents are designed to be very task-specific and work in a well-defined environment.

The class of Intelligent Agents used in Vinimaya's products goes to the next level of performance and capability. In addition to being able to perform the aforementioned tasks (find and filter data, automate processes, etc.), the agents are now able to apply rules within the domain of their application. This capability allows the agents to deal with the non-standard and unstructured world of B2B eCommerce, where inconsistent data formats, disparate protocols, incompatible systems and subjective information is the norm. Additionally, Vinimaya products are considered "multi-agent systems", which means that the agents can collaborate with other agents within the environment—a very complex concept to implement into a commercial product—it is also very powerful when efficiency, speed and accuracy are the priority, which is always the case in B2B eCommerce.

In their current application in Vinimaya's ViniSyndicate eCatalog Management System, the Intelligent Agents are configured to interact with Supplier web sites and eCommerce systems on behalf of the Buyer, automating the locating, translating, enhancing and organizing of product information as required by the Buyer's eProcurement system. This real-time approach is significantly easier and faster to deploy than today's current static data-intensive approaches.

A User on the browser-based procurement system could get to VS by clicking on an external catalog source link named ViniSyndicate (Most procurement systems provide this functionality to access an external catalog source). Once in VS, the User can search across multiple supplier catalogs categorized under standard commodity groups. The search results could be sorted, and the User can refine the set of results to find exactly what he/she is looking for. The User can then add the items to a shopping cart, and can either continue shopping on VS or return back with the cart into the procurement system. Once back on procurement system, the User proceeds with the usual workflow associated with creating a purchase requisition for approval.

Glossary

Java™—Java is a programming language expressly designed for use in the distributed environment of the Internet. It was designed to have the "look and feel" of the C++ language, but it is simpler to use than C++ and enforces an object-oriented programming model. Java can be used to create complete applications that may run on a single computer or be distributed among servers and clients in a network. It can also be used to build a small application module or applet for use as part of a Web page.

JavaBeans™—The JavaBeans component architecture is the platform-neutral architecture for the Java application environment. It's the ideal choice for developing or assembling network-aware solutions for heterogeneous hardware and operating system environments—within the enterprise or across the Internet. The JavaBeans component architecture extends "Write Once, Run Anywhere™" capability to reusable component development. Software components that use JavaBeans are thus portable to containers including Internet Explorer, Visual Basic, Microsoft Word, Lotus Notes, and others. The JavaBeans specification defines a set of standard component software APIs for the Java platform.

JavaServer Pages™ (JSP™)—JavaServer Pages technology is aimed at creating WebPages that are information rich and dynamic. JavaServer pages technology is an extension of the Java™ technology. JSP technology enables rapid development of web-based applications that are platform independent. JavaServer Pages technology separates the user interface from content generation enabling designers to change the overall page layout without altering the underlying dynamic content. JavaServer Pages technology uses tags and scriptlets written in the Java programming language to encapsulate the logic that generates the content for the page. Additionally, the application logic can reside in server-based resources like JavaBeans™ component architecture. By separating the page logic from its design and display and supporting a reusable component-based design, JSP technology makes it faster and easier than ever to build web-based applications.

Java Database Connectivity (JDBC)—JDBC is an application program interface (API) specification for connecting programs written in Java to the data in popular database technologies.

Structured Query Language (SQL)—SQL is a language used to interrogate and process data in a relational database. Originally developed by IBM for its mainframes, all database systems designed for client/server environments support SQL. SQL commands can be used to interactively work with a database or can be embedded within a programming language to interface to a database. Programming extensions to SQL have turned it into a full-blown database programming language.

Hyper Text Markup Language (HTML) HTML is the set of markup symbols or codes inserted in a file intended for display on a World Wide Web browser page. The markup tells the Web browser how to display a Web page's words and images for the user. Each individual markup code is referred to as an element or tag. Some elements come in pairs that indicate when some display effect is to begin and when it is to end. HTML is a formal Recommendation by the World Wide Web Consortium (W3C) and is generally adhered to by the major browsers, Microsoft's Internet Explorer and Netscape's Navigator, which also provide some additional non-standard codes.

Extensible Markup Language (XML) XML is a set of rules for defining semantic tags that break a document into parts and identify the different parts of the document. It is a meta-markup language that defines a syntax used to define other domain-specific, semantic, structured markup languages and provides a flexible way to create common information formats and share both the format and the data on the World Wide Web, intranets, and elsewhere. For example, computer makers might agree on a standard or common way to describe the information about a computer product (processor speed, memory size, and so forth) and then describe the product information format with XML. Any individual or group of individuals or companies that wants to share information in a consistent way can use XML.

JavaScript—JavaScript is the scripting language of the Internet. It is the most popular scripting language on the World Wide Web and is used in millions of Web pages to power rich, interactive content and increasingly powerful web applications. JavaScript is the "glue" that binds together HTML and XML elements accessed through the browser's Document Object Model (DOM), JavaScript scripts, Java applets, and plug-ins and allows these objects to communicate and interoperate. JavaScript can be used both on the client (CSJS) and on the server (SSJS). The JavaScript language can also be used across browsers, applications, platforms, and devices, making it the language of choice for building next-generation web applications.

The invention claimed is:

1. A computer system comprising one or more memories storing software instructions, and one or more processors configured to execute the software instructions to perform operations comprising:
   receiving a user initiated catalog shopping request;
   searching for the request using a plurality of supplier web site search engines to access a set of disparate electronic catalog sources wherein each electronic catalog source has its own search engine;
   locating a set of product information associated with the request in at least one of the electronic catalog sources;
   retrieving said set of product information;
   obtaining a set of translated product information by performing acts comprising translating said set of product information into a standardized format regardless of the format of the electronic catalog sources; and
   rendering a document comprising the set of translated product information.

2. The computer system of claim 1, wherein rendering the document comprising the set of translated product information comprises sending the document comprising the set of translated product information to a buy-side procurement system.

3. The computer system of claim 1, wherein the software instructions comprise instructions configured to communicate with a first procurement system and a second procurement system wherein the first procurement system is configured to accept information in a first format type and the second procurement system is configured to accept information in a second format type.

4. The computer system of claim 1, wherein the user initiated catalog shopping request includes inter-related sub-requests and wherein the software instructions comprise instructions configured to determine, for each sub-request, one or more intelligent agents for searching the set of electronic catalog sources.

5. The computer system of claim 4, wherein the one or more intelligent agents are configured to determine one or more sub-agents for non-invasively searching the set of electronic catalogs.

6. The computer system of claim 5, wherein non-invasively searching the set of electronic catalogs comprises using the one or more intelligent agents and one or more sub-agents on a buy-side of one or more firewalls relative to the one or more electronic catalog sources.

7. The computer system of claim 1, wherein the software instructions comprise instructions configured to store product information as cached results, and wherein the software instructions comprise instructions configured to render one or more cached results in response to a user initiated catalog shopping request.

8. The computer system of claim 1, wherein the software instructions are configured to perform the searching using a distributed remote search configured to utilize the search engines from each of the set of disparate electronic catalog sources.

9. The computer system of claim 1, wherein the set of product information:
   a) comprises information retrieved from multiple electronic catalog sources; and
   b) is multi-formatted.

10. The computer system of claim 1, wherein rendering the document comprising the set of translated product information comprises rendering attribute information which is specific to a particular buyer.

11. The computer system of claim 10, wherein the attribute information which is specific to a particular buyer comprises pricing information generated by a buy-side procurement system of the particular buyer.

12. The computer system of claim 1, wherein each catalog source from the set of disparate electronic catalog sources is a distributed catalog source remotely located from the computer system.

13. A computer implemented method for providing online procurement between a buyer and suppliers over a network, wherein the method is implemented by executing software instructions stored on one or more non-transitory computer readable media by one or more processors, the method comprising:
   receiving a user initiated catalog shopping request;
   searching for the request using a plurality of supplier web site search engines to access a set of disparate electronic catalog sources wherein each electronic catalog source has its own search engine;
   locating a set of product information associated with the request in at least one of the electronic catalog sources;
   retrieving said set of product information;
   obtaining a set of translated product information by performing acts comprising translating said set of product information into a standardized format regardless of the format of the electronic catalog sources; and
   rendering a document comprising the set of translated product information.

14. The method of claim 13, wherein rendering the document comprising the set of translated product information comprises sending the document comprising the set of translated product information to a buy-side procurement system.

15. The method of claim 13, wherein the software instructions comprise instructions configured to communicate with a first procurement system and a second procurement system wherein the first procurement system is configured to accept information in a first format type and the second procurement system is configured to accept information in a second format type.

16. The method of claim 13, wherein the user initiated catalog shopping request includes inter-related sub-requests and wherein the software instructions comprise instructions configured to determine, for each sub-request, one or more intelligent agents for searching the set of electronic catalog sources.

17. The method of claim 16, wherein the one or more intelligent agents are configured to determine one or more sub-agents for non-invasively searching the set of electronic catalogs.

18. The method of claim 17, wherein non-invasively searching the set of electronic catalogs comprises using the one or more intelligent agents and one or more sub-agents on a buy-side of one or more firewalls relative to the one or more electronic catalog sources.

19. The method of claim 13, wherein the software instructions comprise instructions configured to store product information as cached results, and wherein the software instructions comprise instructions configured to render one or more cached results in response to a user initiated catalog shopping request.

20. The method of claim 13, wherein the software instructions are configured to perform the searching using a distributed remote search configured to utilize the search engines from each of the set of disparate electronic catalog sources.

21. The method of claim 13, wherein rendering the document comprising the set of translated product information comprises rendering attribute information which is specific to a particular buyer.

22. The method of claim 21, wherein the attribute information which is specific to a particular buyer comprises pricing information generated by a buy-side procurement system of the particular buyer.

23. The method of claim 13, wherein the set of product information:
   a) comprises information retrieved from multiple electronic catalog sources; and
   b) is multi-formatted.

24. A computer system comprising one or more memories storing software instructions, and one or more processors configured to execute the software instructions to perform operations comprising:
   receiving a user initiated catalog shopping request;
   searching for the request using a plurality of supplier web site search engines to access a set of disparate electronic catalog sources wherein each electronic catalog source has its own search engine;
   locating a set of product information associated with the request in at least one of the electronic catalog sources;
   retrieving said set of product information;
   obtaining a set of translated product information by performing acts comprising translating said set of product information into a standardized format regardless of the format of the electronic catalog sources; and
   rendering a document comprising the set of translated product information;
wherein the software instructions comprise instructions configured to communicate with a first procurement system and a second procurement system wherein the first procurement system is configured to accept information in a first format type and the second procurement system is configured to accept information in a second format type;
wherein the user initiated catalog shopping request includes inter-related sub-requests and wherein the software instructions comprise instructions for determining, for each sub-request, one or more intelligent agents for searching the set of electronic catalog sources;
wherein the one or more intelligent agents are configured to determine one or more sub-agents for non-invasively searching the set of electronic catalogs;
wherein non-invasively searching the set of electronic catalogs comprises using the one or more intelligent agents and one or more sub-agents on a buy-side of one or more firewalls relative to the one or more electronic catalog sources;
wherein the software instructions are configured to perform the searching using a distributed remote search configured to utilize the search engines from each of the set of disparate electronic catalog sources;

wherein the set of product information comprises information retrieved from multiple electronic catalog sources and is multi-formatted; and rendering the document comprising the set of translated product information comprises rendering attribute information which is specific to a particular buyer.

\* \* \* \* \*